United States Patent [19]

Gruber et al.

[11] Patent Number: 5,768,942
[45] Date of Patent: Jun. 23, 1998

[54] DRIVE DEVICE FOR A MOVABLE MOTOR VEHICLE PART

[75] Inventors: Reinhold Gruber, Dietringen; Claus Vordermaier, München; Andreas Schmidt, Gauting, all of Germany

[73] Assignee: Webasto Karosseriesysteme GmbH, Stockdorf, Germany

[21] Appl. No.: 585,915

[22] Filed: Jan. 16, 1996

Related U.S. Application Data

[63] Continuation of PCT/EP94/02358, Jul. 18, 1994.

[30] Foreign Application Priority Data

Jul. 16, 1993 [DE] Germany .......................... 43 23 946.3

[51] Int. Cl.$^6$ .............................. B60T 7/04; E05F 15/10; F16H 1/16
[52] U.S. Cl. ........................ 74/89.14; 74/425; 74/606 R; 296/223
[58] Field of Search .................................. 74/89.14, 425, 74/606 R; 296/223; 403/381, 403

[56] References Cited

U.S. PATENT DOCUMENTS

| | | |
|---|---|---|
| 4,436,338 | 3/1984 | Jardin ....................................... 296/223 |
| 4,556,835 | 12/1985 | Vogel et al. . |
| 4,659,140 | 4/1987 | Fuerst et al. ............................ 296/223 |
| 4,659,141 | 4/1987 | Masuda et al. .......................... 296/223 |
| 4,910,445 | 3/1990 | Borrmann . |
| 5,181,891 | 1/1993 | Pohl et al. ........................... 296/223 X |

FOREIGN PATENT DOCUMENTS

| | | |
|---|---|---|
| 0 252 481 | 1/1988 | European Pat. Off. . |
| 0 351 280 | 1/1990 | European Pat. Off. . |
| 0 538 495 B1 | 7/1991 | European Pat. Off. . |
| 477933 | 4/1992 | European Pat. Off. . |
| 27 56 531 | 6/1979 | Germany . |
| 28 38 678 | 3/1980 | Germany . |
| 30 21 948 A1 | 12/1981 | Germany . |
| 29 14 864 | 3/1988 | Germany . |
| 38 38 285 A1 | 2/1990 | Germany . |
| 39 30 053 A1 | 3/1990 | Germany . |

OTHER PUBLICATIONS

European Patent Office Abstract of U.S.4623764, p. 1, with drawing attached.

*Primary Examiner*—Rodney H. Bonck
*Assistant Examiner*—Troy Grabow
*Attorney, Agent, or Firm*—Sixbey, Friedman, Leedom & Ferguson; David S. Safran

[57] ABSTRACT

Drive device for a part of a motor vehicle which can be moved between end positions, with an electric motor which is joined via a reducing gear to a driving pinion which sits on a driven shaft, and which for its part is drive-connected to the displaceable part, and with an electrical circuit which has switching means and which controls the motor for shutting off the motor in a predetermined position of the displaceable part. The reducing gear and electrical circuit are accommodated in separate housing parts which are detachably joined to one another to enable flexible matching to different circuit layouts. The gear housing part is produced as a metal die casting and the electric housing part as an injection molded plastic part.

19 Claims, 6 Drawing Sheets

DRIVE DEVICE FOR A MOVABLE MOTOR VEHICLE PART

CROSS REFERENCE TO RELATED APPLICATION

This application is a continuation of International Patent Application No. PCT/EP94/02358 designating the United States.

BACKGROUND OF THE INVENTION

1. Field of the Invention

The invention relates to a drive device for a part of a motor vehicle which can be displaced between end positions, especially for the cover for a vehicle roof opening, with an electric motor which is joined via a reducing gear to a driving pinion which sits on a driven shaft which is drive-connected to the displaceable part. Furthermore to such a drive device with an electrical circuit which has switching means and which controls the motor for shutting off the motor in at least one predetermined position of the displaceable part.

2. Description of Related Art

Drive devices of this type are known in different embodiments. In one known embodiment (EP 0 351 280 A1 and DE 28 38 678 A1), the electric motor, the reducing gear and the electrical circuit together, with a switching means, are accommodated in a common housing. In other known embodiments (DE 29 14 864 C3 and EP 0 477 933 A1), the electric motor is flanged to a housing which holds the reducing gear and the electrical circuit together with the switching means, in the case of the arrangement according to EP 0 477 933 A1, there being a wiring harness which is laid outside of the housing and via which the electrical circuit is connected to the motor terminals.

In practice, the electrical circuit which controls the electric motor is designed in different versions which are adapted to the specific requirements of the particular vehicle type, and which are designed to be more or less complex, and thus can be built from more or less numerous parts, such as, e.g., relays. For example, the design of the control circuit depends on the number of positions of the displaceable vehicle part to be approached and on whether and which additional functions are provided, for example, automatic actuation of the displaceable vehicle part depending on the speed of the vehicle, coupling of the control circuit to the ignition lock and/or a central locking system and the like. For these various design versions, in the past, appropriately adapted and thus differently shaped housings had to be provided or the housing was dimensioned such that it could hold control circuit versions with most or the most space-intensive components, for example, the version which requires the most relays. The approach mentioned first requires a range of relatively expensive housings, associated with relatively high tool costs for housing manufacture, at the same time, these housings are made for reasons of strength generally of metal, especially as a die casting. In the second approach, the housing when using more simple circuit versions is inevitably unnecessarily large and heavy; this represents a major disadvantage in vehicle manufacture.

SUMMARY OF THE INVENTION

In view of the foregoing, a primary object of the present invention is to devise a drive device of the type mentioned initially which allows a simple, cost-saving adaptation to different versions of the control circuit and which enables the housing dimensions to be limited to the values necessary in the individual case at low cost.

Proceeding from a drive device of the type mentioned initially, this object is achieved, according to the invention, by the fact that the reducing gear and the electrical circuit are accommodated in separate housing parts which are detachably joined to one another (one gear housing part or one electric housing part), the gear housing part being executed as a metal die casting and the electric housing part as a plastic injection molding.

In the drive device according to the invention, for all versions, the same gear housing part can be utilized, while the electric housing part is designed and dimensioned in adaptation to the respective version of the control circuit. By joining the unchanging gear housing part and the electrical housing part tailored to the respective circuit version, an overall arrangement which is optimally adapted to the given requirements can consequently be obtained easily and in a cost-saving manner. The gear housing part formed as a metal die casting has relatively high strength, even if for reasons of space its dimensions are minimized. The electrical housing part manufactured as an plastic injection molding can be kept especially light and overall housing costs remain comparatively low.

The electric motor can be mounted to the gear housing part by mounting flanges. Optionally, the design can be effected such that the gear housing part is used for additional accommodation of the electric motor.

Attachment elements for attaching the drive device to the vehicle or a part which is attached securely to the vehicle and which supports the displaceable part, for example, a roof frame, are advantageously provided only on the gear housing part, which is usually designed to be relatively sturdy and which, then, bears the electric housing part. The gear housing part and the electric housing part can be easily covered by a common cover which is preferably clipped to the gear housing part and electric housing part.

For a detachable mutual connection of the gear housing part and electric housing part, in another embodiment of the invention, there are plug-in connection parts on these housing parts, especially molded on ones. In this case, advantageously, at least one of the plug-in connection parts of the gear housing part can rest against at least one side and/or end wall of the electric housing part over a large area to support the electric housing part.

At least some of the circuit components of the electrical circuit are advantageously mounted on a single electrical circuit board which is detachably connected to the electric housing part, preferably via plug-in connection parts. In another version of the invention, the electrical circuit can be detachably connected to terminals of the electric motor via plug-in contacts, the plug-in contacts for the power supply of the electric motor being attached preferably to the circuit board. In this way, the control circuit can be connected to the electric motor, and if necessary, also replaced without the need for soldering activities, for example.

The circuit board can, moreover, bear at least one socket for plug connection of the electrical circuit to external modules.

If, in the conventional manner (for example, EP 0 469 286 A2), for actuating the switching means, a ratchet wheel is provided which, when the vehicle part is set between its end positions, is caused to rotate less than 360° via an eccentric toothed gearing, the ratchet wheel together with the eccentric toothed gearing is, preferably, also accommodated in the electric housing part, although, it is fundamentally also possible to assign the ratchet wheel and the eccentric toothed gearing to the gear housing part.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
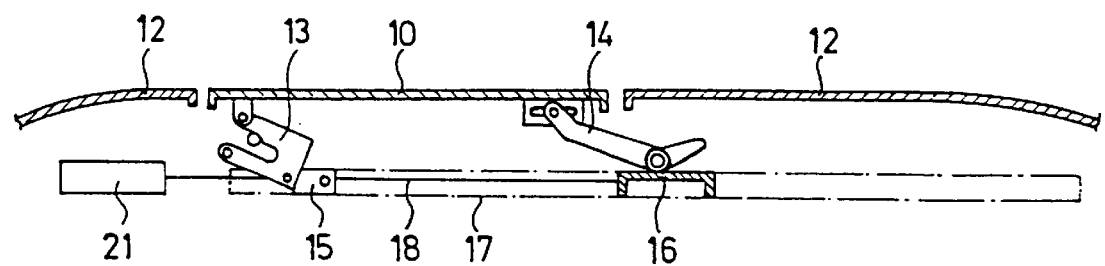
FIG. 1 is a schematic longitudinal section of a vehicle sliding roof with the cover in the closed position.
Figure 2:
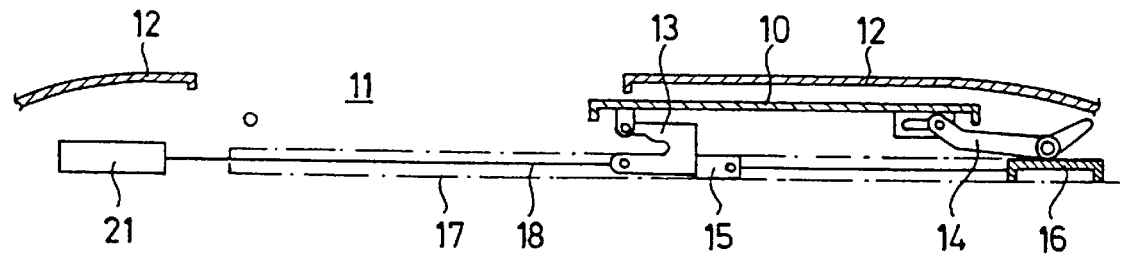
FIG. 2 is a sectional view corresponding to that of FIG. 1, but with the cover in the open position.

The sliding vehicle roof shown in FIGS. 1 and 2 has a cover 10 which in a closed position (FIG. 1) closes a roof opening 11 which is formed in fixed roof surface 12. Cover 10 is supported on each lateral side by a front cover support 13 and a rear cover support 14. Cover supports 13 are connected to front slides 15 and cover supports 14 are connected to rear slides 16, both of which are movably guided in the longitudinal direction of the vehicle along longitudinal guides 17 attached at the lateral sides of the roof opening 11. In this case, a drive cable 18, preferably a threaded cable, acts on each of the right and left rear slides 16. Drive cables 18 interact with driving pinion 20 (FIGS. 3 and 13) of a drive device labelled 21 overall. Longitudinal guides 17 can be part of a roof frame or can be supported on a roof frame (not shown) which borders the roof opening in a known manner.

Driving pinion 20 is driven by electric motor 22 via reducing gear arrangement 23. Reducing gear arrangement 23 includes a worm shaft 24 that is driven, preferably directly, by a motor 22, and a worm wheel 25 which meshes with worm shaft 24. Worm wheel 25 is joined, in the embodiment shown, to shaft 26 so as to rotate therewith, and at the same, shaft 26 is joined to driving pinion 20 so as to rotate therewith, thereby forming the driven shaft of drive device 21. Shaft 26 is supported via a bearing bush 27 in gear housing part 30. Electric motor 22 is flanged-mounted to the gear housing part 30, and for this reason the electric motor 22 and the gear housing part 30 are equipped with flange elements 31 and 32 in which openings 33 and 34 are formed. Openings 33 and 34, in the assembled state, are flush with one another in pairs through which corresponding attachment elements, for examples, screws, pass. Gear housing part 30 is made as a metal die casting. Electric housing part 35 is made in the form of a plastic injection molded part that is detachably connected to gear housing part 30. For this reason, plug-in connection parts are molded on the housing parts 30 and 35. In the embodiment shown, these plug-in connection parts include two tabs 36 and 37 which project from the gear housing part 30 and which can be inserted into seats 38, 39 of electric housing part 35. Furthermore, an arm 41 having a seat 40 on its free end is molded on gear housing part 30, while adjacent to the inside of a side wall 42 of gear housing part 35, two elastically flexible tabs 43 are joined to the housing part 35 which are inserted into seat 40 when housing parts 30 and 35 are mated. When the housing parts 30, 35 are mated, arm 41 lies, over a large area, against a offset shoulder 64 of electric housing part 35 and against the inside of side wall 42, by an which especially stable supporting of the electric housing part 35 is ensured.

Gear housing part 30 and electric housing part 35 are covered by common cover 44. Cover 44 is detachably connected to the housing parts 30 and 35. For this reason, elastically deflectable tabs 45 which are each provided with recess 46 are molded on the cover 44 which is preferably formed of a plastic injection molded part. Projections 47 sit on the outside of gear housing part 30 and electric housing part 35 and are inserted into recesses 46 when the cover 44 is applied thereon, and can be deflected off of them to remove the cover for subsequent servicing or the like.

Gear housing part 30, furthermore, has three attachment elements 48, 49, and 50 which are used for three-point support of entire drive device 21 on the vehicle.

Electric housing part 35 is used to accommodate an electrical circuit labelled 51 as whole, and which includes, especially, a switching means 52 which controls electric motor 22. At least some of the circuit components of electrical circuit 51, including switching means 52, are mounted on a printed circuit board 53 which is detachably connected to the electric housing part 35. Preferably, plug-in connection parts are provided for interconnection of the circuit board and electric housing part 35. For this reason, on one end of circuit board 53, a front wall part 54 is provided extending perpendicular to the circuit board to form a tab 55 which can be inserted into a U-shaped receiver 56 on the inner surface of the electric housing part 35. Additional plug-in connection parts can be provided if necessary, for example, pins 57 are injection molded on electric housing part 35 and are inserted into complementarily shaped recesses 58 in circuit board 53 or parts joined securely thereto, for example, to switching means 52 (FIG. 13).

Figure 3:
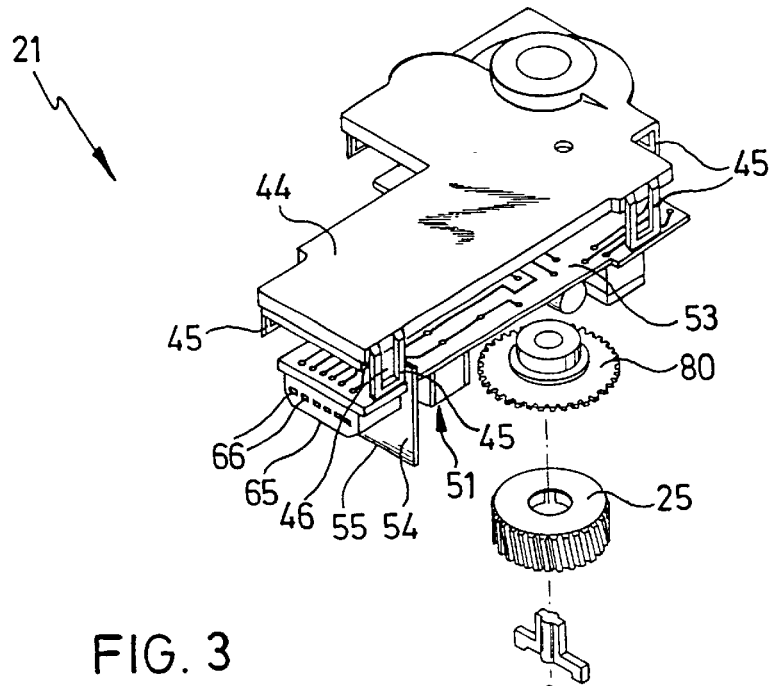
FIG. 3 is an exploded view of the drive device of the vehicle roof according to FIGS. 1 and 2.
Figure 3:
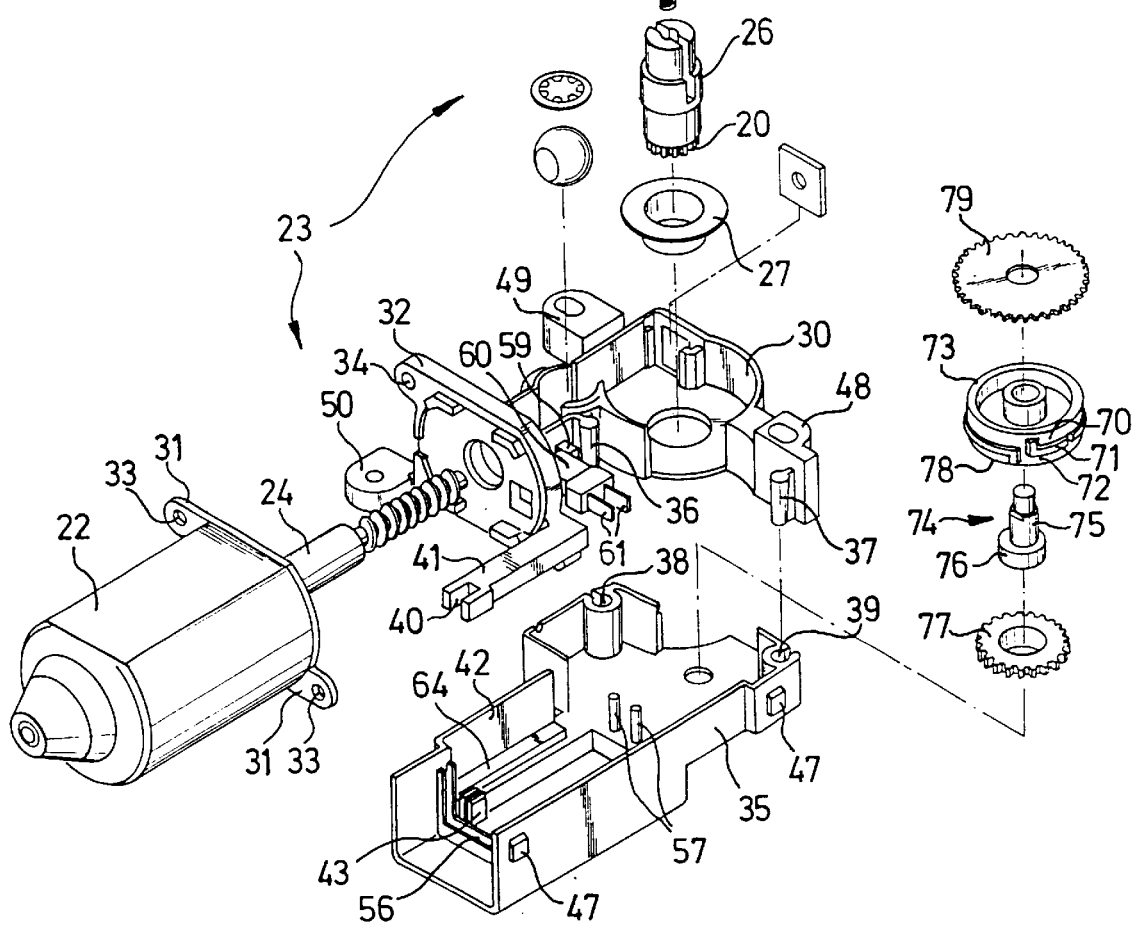

A plug contact carrier 60 with two projecting plug contacts 61 which are conductively connected to terminals 62 of electric motor 22 (FIG. 13) are inserted into a receiver 59 molded on gear housing part 30. Elastically deflectable socket contacts 63 are attached to circuit board 53; the plug contacts 61 are inserted between them when circuit board 53 is joined to the electric housing part 35 which is detachably attached to gear housing part 30. In this way, a plug connection between motor terminals 62 and electrical circuit 51 is provided. A socket 65 is attached to circuit board 53 and is provided with socket contacts 66 which are connected to circuit 51 (FIG. 3). For example, socket 65 can have a socket housing which is integrally joined to the front wall part 54. Socket 65 provides a plug connection of electrical circuit 51 to external modules, for example, a power supply, pushbuttons, a central locking system, tachosignal transformer and the like. The electric circuit and its connection to external modules can be made in a conventional manner (for example, in the manners known from published European Application 0 477 933 A1, or from the published German Applications DE 38 29 405 A1, DE 38 30 555 A1, DE 39 30 053 A1,and DE 33 24 107 A1), and therefore, do not require a more detailed explanation.

Figure 13:
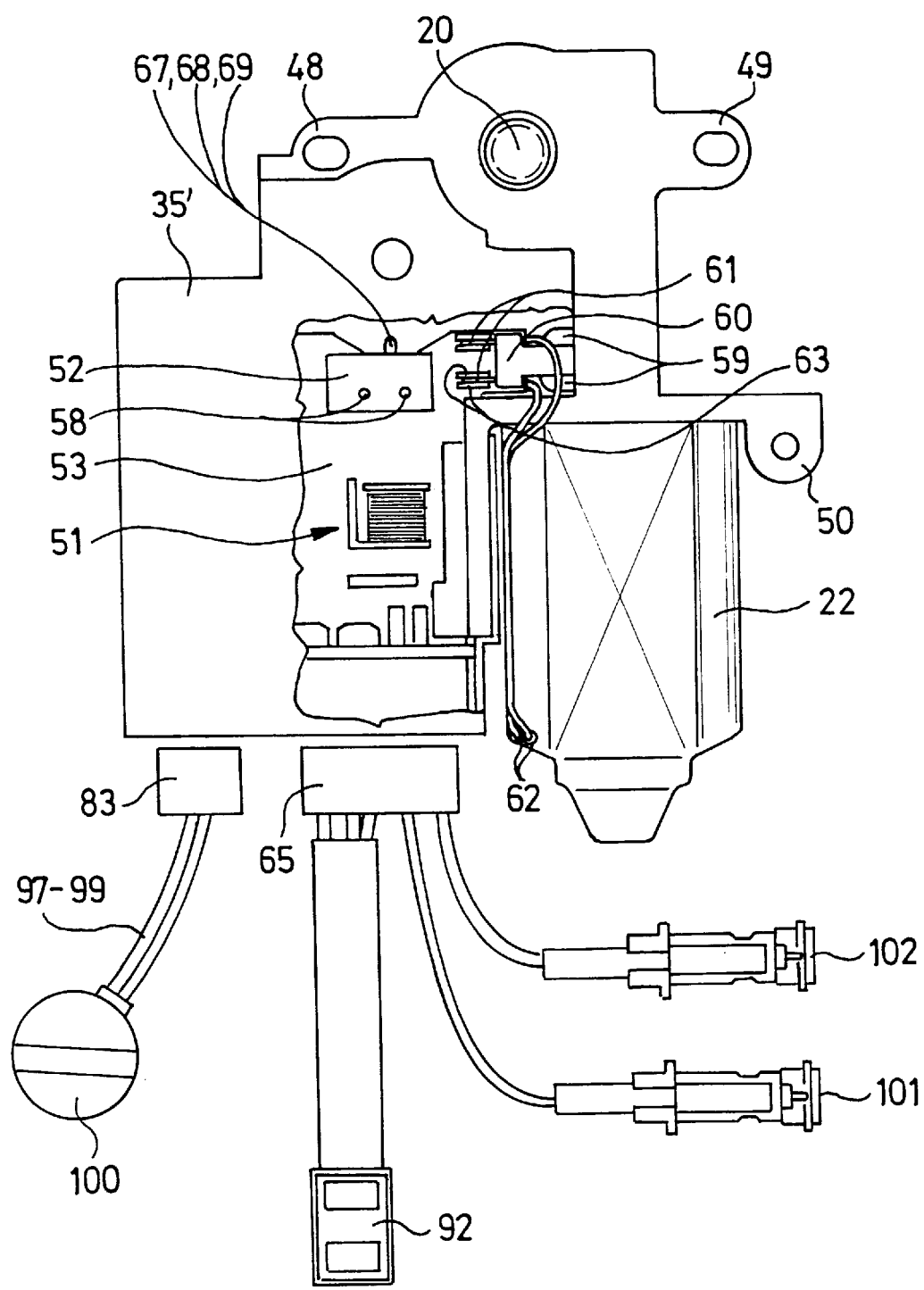
FIG. 13 shows a rear view of the drive device according to FIG. 10.

In the embodiment of drive device 21 shown in FIGS. 3 and 13, the switching means 52 has three switches on top of one another with actuating members labelled 67, 68, and 69. Actuating members 67, 68, and 69 interact with a respective one of three axially offset cam paths 70, 71 or 72 on the periphery of ratchet wheel 73 in order to automatically stop cover 10 when it reaches predefined positions, for example, one or the other of the cover end positions shown in FIGS. 1 and 2.

In a transition of cover 10 from one cover end position into the other cover end position, the worm wheel 25 executes several revolutions. The given rotary position of worm wheel 25 is, therefore, unsuited for an unambiguous acquisition of the cover position. In order to acquire an unambiguous physical relationship, between either the worm wheel 25 or shaft 26 and the ratchet wheel 73, an eccentric toothed gearing, labelled 74 overall, is provided and which is designed such that ratchet wheel 73 is caused to rotate less than 360° in the course of displacement of the cover 10 from one end position into the other end position.

Eccentric toothed gearing 74 is comprised of a shaft 75 with an eccentric 76 fixed to rotate with it, an externally toothed internal gear wheel 77 and an internally toothed external gear wheel 78 which meshes with it. Annular internal gear wheel 77 is rotationally mounted on eccentric 76. The external gear wheel 78 is fixed to the ratchet wheel 73 so as to rotate therewith. The internal gear wheel 77 is prevented from rotating relative to the external gear wheel 78, but can move back and forth along a displacement axis on which a wobbling is superimposed. Gear 79 is also connected to the shaft 75 so as to rotate therewith. Gear 79 meshes with gear 80 connected to shaft 26. Details on the structure and operation of the eccentric toothed gearing 74 and can be found in German patent application No. P 43 23 945, and in a modified form, U.S. Pat. No. 5,181,891, and do not, by themselves, represent part of this invention.

Figure 4:
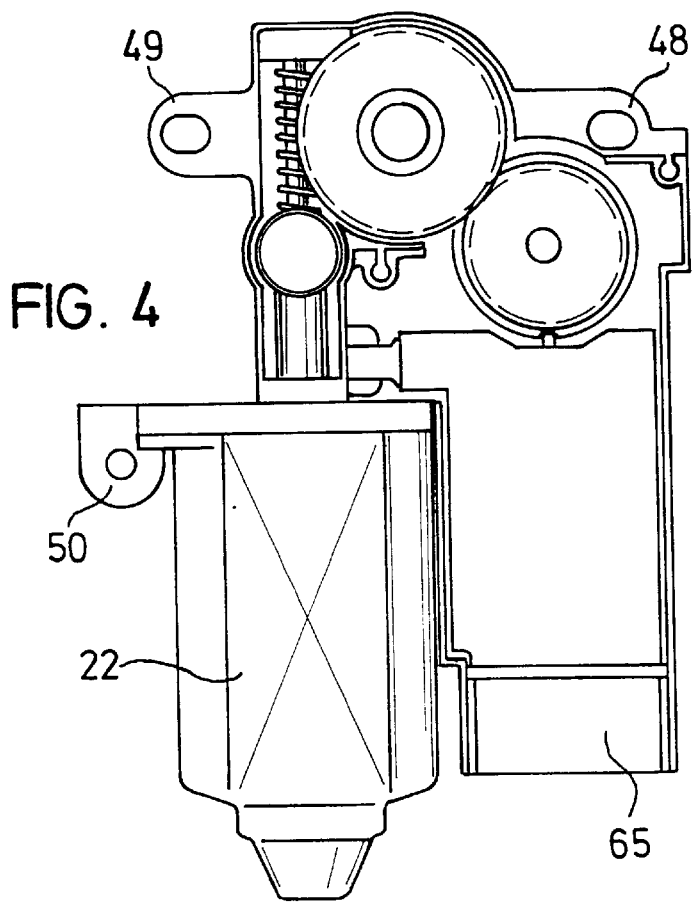
FIG. 4 shows an overhead view of the drive device according to FIG. 3.
Figure 5:
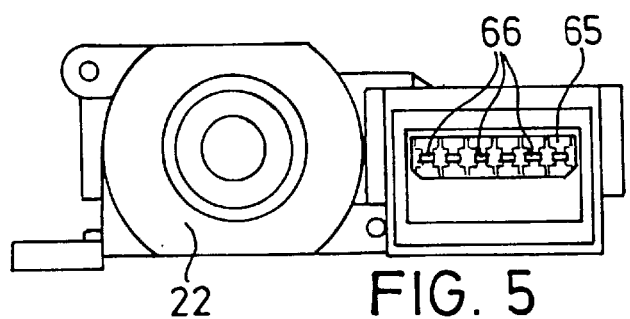
FIG. 5 is a front view of the drive device according to FIG. 4.
Figure 6:
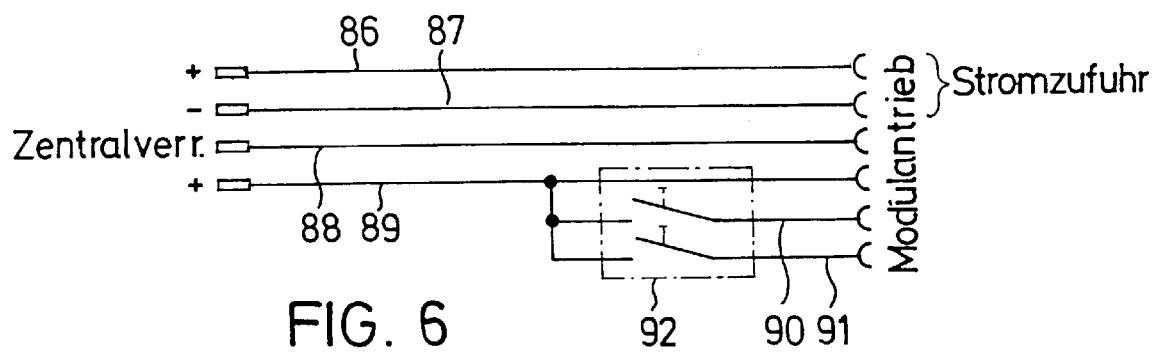
FIG. 6 shows a schematic circuit diagram of the connection arrangement which leads to the drive device.

In the embodiment according to FIGS. 4 through 6, the connection arrangement to be joined to socket contact 66 of socket 65 comprises two current feed lines 86 and 87, a line 88 connected to a central locking system of the vehicle, and lines 89 through 91 for connection of pushbutton 92. Connection of the drive device to the central locking system can result in cover 10 automatically moving into the closed position when the vehicle is locked. Via pushbutton 92, cover 10 is optionally adjusted by hand. In doing so, the circuit which includes line 89 leads via the ignition lock (not shown) of the vehicle so that the cover can only be opened after the ignition is turned on.

Figure 7:
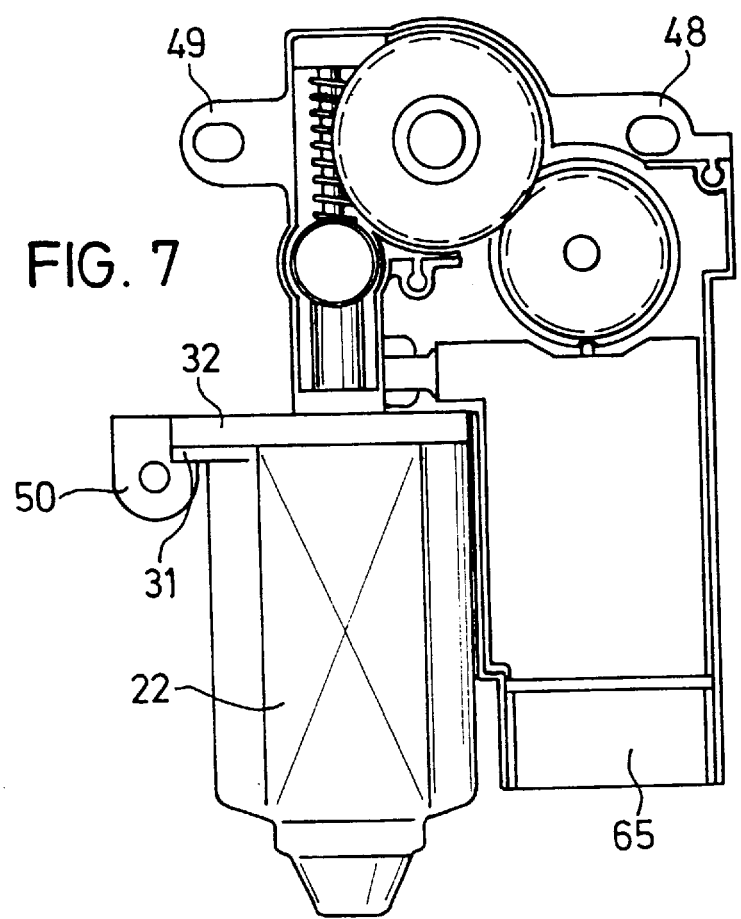
FIGS. 7 through 9 views corresponding to those FIGS. 4 through 6, respectively, but showing a modified embodiment of the invention.
Figure 8:
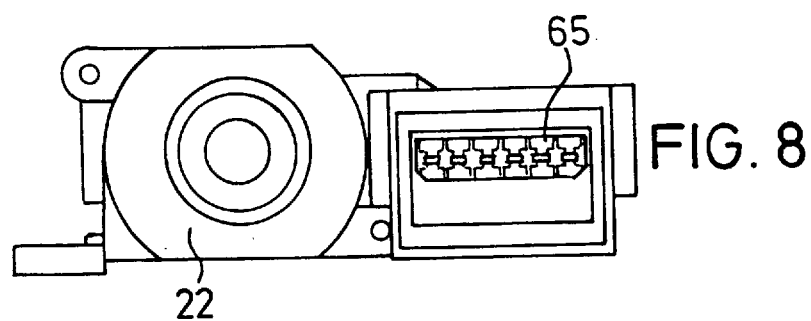
Figure 9:
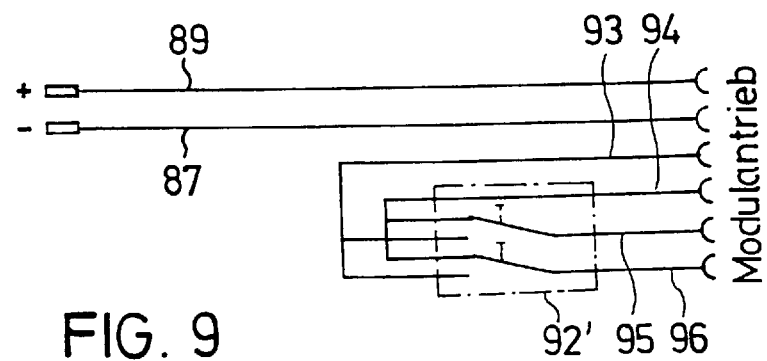
Figure 10:
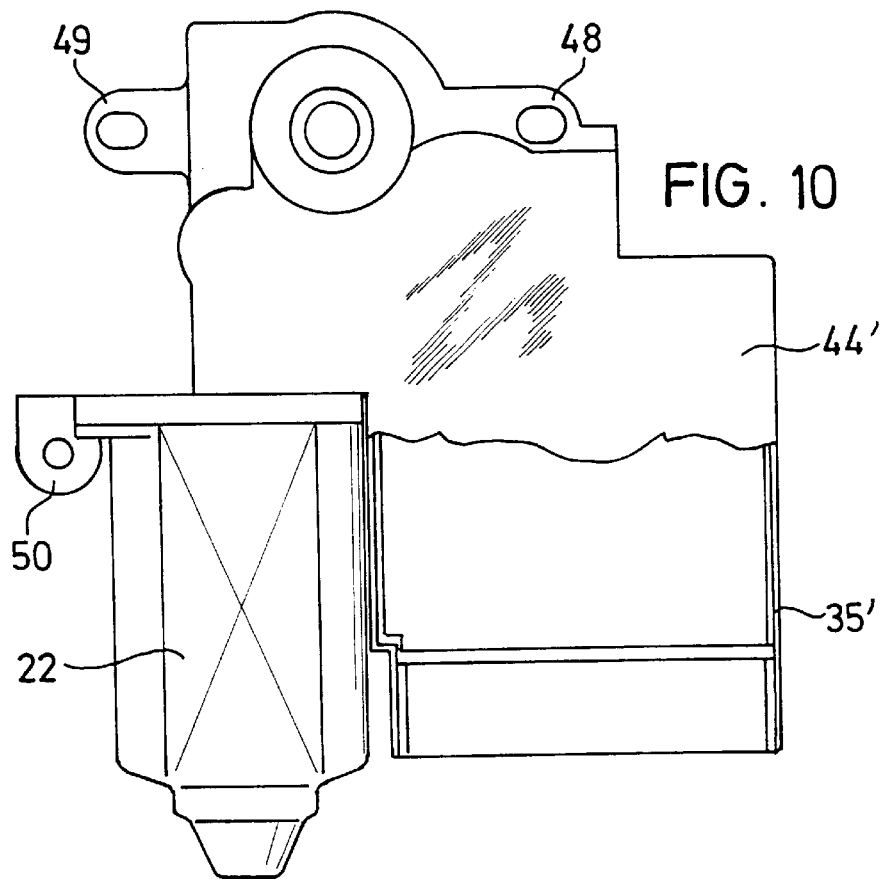
FIGS. 10 through 12 are also views corresponding to those FIGS. 4 through 6, respectively, but showing a second modified embodiment of the invention.
Figure 11:
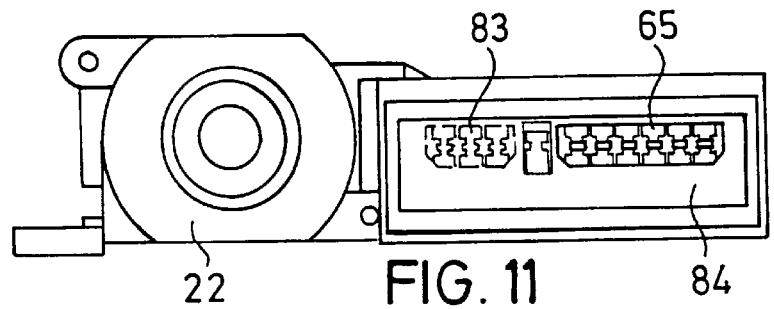

In the case of the modified embodiment according to FIGS. 7 to 9, power is delivered to the cover drive device via lines 87 and 89. Pushbutton 92' is formed as a double-pole, double-throw switch and is connected to circuit 51 via lines 93, 94, 95 and 96.

The embodiments according to FIGS. 3 through 9 are equipped with the same electric housing part 35 and accordingly also with the same housing cover 44.

The embodiment according to FIGS. 10 through 13 is intended for use with an automatic positioning means as is known for example from published German Patent Application DE 33 24 107A1. In this automatic positioning means, there is a setpoint generator for the position of cover 10, and the drive device of the cover is formed as part of a control circuit which compares the position selected on the setpoint generator to the given current position of the cover and adjusts the cover position until the control deviation has become zero.

Figure 12:
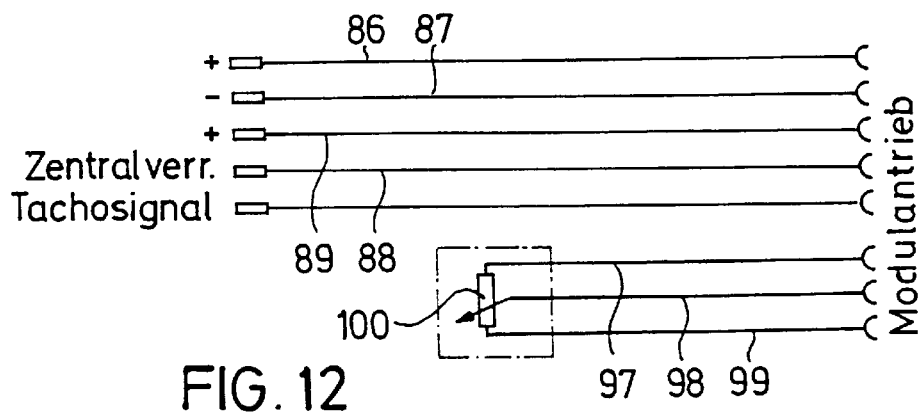

According to FIG. 12, lines 97, 98 and 99 are provided which are connected to position setpoint generator 100 which is present, for example, in the form of a potentiometer. Lines 97 through 99 lead to the second socket 83 (FIG. 11) which, together with socket 65, is accommodated in common socket housing 84. In addition, connections to a pushbutton, for example, pushbutton 92, can be optionally provided.

FIG. 13 shows ignition lock 101 and central locking system 102 in addition to pushbutton 92 and position setpoint generator 100.

Because, in the embodiment according to FIGS. 10 through 13, the electrical circuit is made more complex and accordingly requires more space, an electric housing part 35' which has a greater width than electric housing part 35 is coupled to the gear housing part 30 which remains unchanged. Accordingly, a wider housing cover 44' is also provided.

It goes without saying that the invention is not limited to the described embodiments. For example, the displaceable vehicle part can be a side window of a motor vehicle instead of a sunroof type cover panel. The electric housing parts detachably connected to the gear housing part can also differ not only in their width, but also, optionally, in their length and/or height. The gear housing part and electric housing part can, as desired, be equipped with separate covers. Thus, the invention should be viewed to broadly cover any features and modifications encompassed by the scope of the appended claims.

We claim:

1. Drive device for a part of a motor vehicle which is displaceable between end positions, comprising an electric motor which is joined via a reducing gear to a driving pinion which sits on a driven shaft, the driven shaft being drive-connected to the displaceable part, and an electrical circuit which comprises circuit components including switching means for shutting off the motor in at least one predetermined position of the displaceable part, at least some of said circuit components being mounted on an electrical circuit board; wherein the reducing gear and the electrical circuit board are disposed in separate housing parts which are covered by the same housing cover, the separate housing parts being detachably joined to one another and to the housing cover and wherein the separate housing parts comprise a gear housing part formed of a metal die casting and an electric housing part formed of plastic injection molded part.

2. Drive device according to claim 1, wherein the electric motor is flange mounted to the gear housing part.

3. Drive device according to claim 1, further comprising attachment elements for attaching the drive device to a vehicle and which supports the displaceable part only on the gear housing part.

4. Drive device according to claim 1, wherein the housing cover carries elastically deflectable tabs clip over counterstays on the housing parts.

5. Drive device for a part of a motor vehicle which is displaceable between end positions, comprising an electric motor having a drive shaft which is joined via a reducing gear to a driving pinion which sits on a driven shaft, the driven shaft being drive-connected to the displaceable part, and an electrical circuit which has switching means for shutting off the motor in at least one predetermined position of the displaceable part; wherein the reducing gear and the electrical circuit are disposed in separate housing parts which are covered by at least one housing cover and which are detachably joined to one another, the separate housing parts comprising a gear housing part formed of a metal die casting and an electric housing part formed of plastic injection molded part; and wherein plug-in connection parts are provided on the gear housing part and the electric housing part for detachably connecting the gear housing part and the electric housing part to one another by relative displacement therebetween in a direction perpendicular to the drive shaft of the motor.

6. Drive device according to claim 5, wherein the plug-in connection parts are molded-on portions of the respective housing part.

7. Drive device according to claim 5, wherein at least one of the plug-in connection parts of the gear housing part rests against at least one inner wall surface of the electric housing part to support the electric housing part.

8. Drive device according to claim 1, wherein the electrical circuit board is detachably connected to the electric housing part via plug-in connection parts.

9. Drive device according to claim 8, wherein the electrical circuit is detachably connected to terminals of the electric motor via plug-in contact pairs for supplying power to the electric motor.

10. Drive device according to claim 9, wherein each of the contacts of the plug-in contact pairs for power supply to the electric motor are separately attached to circuit board.

11. Drive device according to claim 8, wherein the circuit board has at least one socket for plug connection of the electrical circuit to external modules.

12. Drive device according to claim 1, wherein a ratchet wheel is provided for actuating the switching means, said ratchet wheel being rotated less than 360° via an eccentric toothed gearing when the displaceable part is moved from one of its end positions to the other; and wherein the ratchet wheel together with the eccentric toothed gearing is disposed in the electric housing part.

13. Drive device according to claim 12, wherein the displaceable part is a cover with which an opening in a vehicle roof is opened and closed.

14. Drive device according to claim 1, wherein the displaceable part is a cover with which an opening in a vehicle roof is opened and closed.

15. Drive device according to claim 14, wherein the electric motor is flange mounted to the gear housing part.

16. Drive device according to claim 14, wherein plug-in connection parts are provided on the gear housing part and the electric housing part for detachably connecting them to each other.

17. Drive device according to claim 16, wherein the plug-in connection parts are molded-on portions of the respective housing part.

18. Drive device according to claim 16, wherein at least one of the plug-in connection parts of the gear housing part rests against at least one inner wall surface of the electric housing part to support the electric housing part.

19. Drive device according to claim 13, wherein the electrical circuit comprises circuit components, at least some of which are mounted on an electrical circuit board; and wherein the electrical circuit board is detachably connected to the electric housing part via plug-in connection parts.

* * * * *